US012753817B2

(12) United States Patent
Chen

(10) Patent No.: US 12,753,817 B2
(45) Date of Patent: Oct. 6, 2026

(54) HYDRAULIC BRAKE WITH TRAVEL ADJUSTMENT MECHANISM

(71) Applicant: Cixi Energy Refined Fishing Co., Ltd., Cixi City (CN)

(72) Inventor: Yonggang Chen, Cixi City (CN)

(73) Assignee: Cixi Energy Refined Fishing Co., Ltd., Cixi City (CN)

( * ) Notice: Subject to any disclaimer, the term of this patent is extended or adjusted under 35 U.S.C. 154(b) by 366 days.

(21) Appl. No.: 18/536,085

(22) Filed: Dec. 11, 2023

(65) Prior Publication Data

US 2024/0191764 A1 Jun. 13, 2024

(30) Foreign Application Priority Data

Dec. 12, 2022 (CN) ......................... 202223343415.8

(51) Int. Cl.

| | |
|---|---|
| ***B62L 3/02*** | (2006.01) |
| ***F16D 65/16*** | (2006.01) |
| ***F16D 65/46*** | (2006.01) |
| *F16D 121/04* | (2012.01) |
| *F16D 125/40* | (2012.01) |
| *F16D 125/64* | (2012.01) |
| *F16D 127/02* | (2012.01) |

(52) U.S. Cl.

CPC ............. *F16D 65/46* (2013.01); *F16D 65/16* (2013.01); *F16D 2121/04* (2013.01); *F16D 2125/40* (2013.01); *F16D 2125/64* (2013.01); *F16D 2127/02* (2013.01)

(58) Field of Classification Search

CPC ................................. B62L 3/023; B60T 7/102

See application file for complete search history.

(56) References Cited

U.S. PATENT DOCUMENTS

| | | | | |
|---|---|---|---|---|
| 7,857,112 B1 * | 12/2010 | Tsai | ........................ | B62L 3/023 188/344 |
| 2007/0107995 A1 * | 5/2007 | Jen | .......................... | B62L 3/023 188/72.1 |
| 2008/0245632 A1 * | 10/2008 | Watarai | ................... | B62L 3/023 188/344 |

FOREIGN PATENT DOCUMENTS

| | | | | |
|---|---|---|---|---|
| DE | 102021108983 A1 * | 10/2022 | .............. | B62L 3/023 |

OTHER PUBLICATIONS

Machine translation of DE 102021108983 (no date).*

* cited by examiner

*Primary Examiner* — Nicholas J Lane

(74) *Attorney, Agent, or Firm* — Inskeep IP Group, Inc.

(57) ABSTRACT

Disclosed herein is a hydraulic brake with travel adjustment mechanism, comprising a brake body with a pressure cylinder; a piston rod extending through the pressure cylinder; a lever; a spring connected between the piston rod and the pressure cylinder; a brake hose connected to the other end of the brake body; a connecting rod, one end of which is connected to the lever, and the other end of which extends through the pressure cylinder to form a transmission engagement with the piston rod, a limiting component is arranged inside the pressure cylinder, and the limiting component acts on the connecting rod to restrict the connecting rod from leaving the pressure cylinder; an adjustable chamber is arranged in the connecting rod, and an adjustment element is provided inside the adjustable chamber, one end of which extends out of the adjustable chamber and forms a transmission engagement with the piston rod.

7 Claims, 9 Drawing Sheets

HYDRAULIC BRAKE WITH TRAVEL ADJUSTMENT MECHANISM

RELATED APPLICATIONS

This application claims benefit of and priority to Chinese Patent Application No. 2022233434158 filed Dec. 12, 2022, which is hereby incorporated herein by reference in its entirety.

TECHNICAL FIELD

The disclosure relates to the field of hydraulic brakes, in particular to a hydraulic brake with travel adjustment mechanism.

BACKGROUND

Brakes play a crucial role in ensuring vehicle's safety, as the quality of brakes can significantly impact the lives of riders. This is particularly important for riders engaged in high-speed sports, where the structure and efficiency of the brakes must be comprehensive and well-designed. Even with exceptional riding skills, without a well-functioning brake system, riders are unable to have full control over their bicycles. This is especially critical during high-speed riding, where both momentum and kinetic energy reach their maximum values. Inability to brake smoothly poses a significant risk, endangering the lives of both the rider and others, and can potentially lead to catastrophic accidents.

Brake is a device that enables the moving parts (or machinery) to decelerate, stop, or maintain a stopped state. It is a mechanical component that stops or slows down the moving parts in a machine, commonly referred to as a brake or brake system. The brake is mainly composed of a brake frame, brake components, and an operating device. Some brakes are also equipped with an automatic adjustment device for brake clearance. To reduce the braking torque and structural size, brakes are usually installed on the high-speed shaft of equipment. However, for larger equipment with high safety requirements, such as mine hoists and elevators, brakes should be installed on the low-speed shaft near the working part of the equipment.

In transportation vehicles such as bicycles, the device used to control the brake is called the brake lever (commonly known as the brake handle). The brake lever is a handle used during braking and is found on bicycle brake handles, children's bike handles, electric bike brake handles, motorcycle brake handles, and so on. With the continuous advancement of technology, traditional brake systems that relied on solid mediums such as steel cables for transmission have gradually been phased out in bicycles and other transportation vehicles available on the market. They have been replaced by hydraulic brake systems that use liquid mediums for transmission. The most representative example is the hydraulic brake system. The principle of a hydraulic brake is to combine one end of the brake hose with an output end of the internal oil circuit of the brake lever seat, while the other end of the brake hose is connected to a disc brake. When the brake lever is pressed, it actuates the piston rod inside the oil circuit, applying pressure to the disc brake through the brake hose, thus engaging the disc brake operation. During the process of pressing the hydraulic brake lever to activate the braking, the movement of the piston rod inside the oil circuit, driven by the brake lever, is necessary to apply the brake force to the disc brake. Until this movement is completed, the hydraulic fluid does not exert any force on the disc brake. This stage is referred to as the "free stroke." The length of the free stroke of a hydraulic brake determines its sensitivity in operation. Different users and different usage environments require different levels of sensitivity in hydraulic brakes. Therefore, the free stroke of hydraulic brakes available in the market can be adjusted. However, the current adjustment method for the free stroke of hydraulic brakes is based on changing the distance between the brake lever and the brake body, which alters the grip distance of the lever and ultimately adjusts the free stroke of the brake.

For example, Chinese patent application No. 201911317220.6 discloses: "a hydraulic brake adjustable span handle, comprising a handle, a handle connecting seat, and a hydraulic brake master cylinder. The handle connecting seat is articulated with the handle, and a handle span adjustment mechanism is provided between the handle connecting seat and the handle. The hydraulic brake master cylinder is articulated with the handle connecting seat, and a push rod is provided between the piston of the hydraulic brake master cylinder and the handle connecting seat. One end of the push rod is connected to the outer end of the piston, and the other end of the push rod is installed in the push rod hole of the handle connecting seat. A brake reach adjustment mechanism is provided between the handle connecting seat and the hydraulic brake master cylinder. This hydraulic brake with adjustable span handle has the advantages of convenient and quick operation, simple structure, better ergonomics, and meeting the needs of a wider range of people."

However, the above method of adjusting the free stroke length of a hydraulic brake by changing the grip distance of the brake lever poses a problem. Each driver's grip habits and hand size are different, it is bound to affect the normal operation of the driver. In some cases, if the grip distance is too large, it may even prevent drivers with small hands from effectively gripping the lever. Therefore, there is an urgent need to develop a hydraulic brake system that can adjust the free stroke length without changing the grip distance of the brake lever.

SUMMARY

In order to overcome the drawbacks of the existing technique, which relies on adjusting the grip distance to change the free stroke length of a hydraulic brake and affects the driver's operation, this disclosure provides a hydraulic brake with travel adjustment mechanism.

The technical solution provided by the disclosure is as follows.

A hydraulic brake with travel adjustment mechanism, comprising:

- a brake body in which a pressure cylinder is arranged;
- a piston rod movably inserted into the pressure cylinder;
- a lever rotatably connected to one end of the brake body and forming a driving connection with the piston rod while being subjected to an external force;
- a spring that exerts force on the piston rod to maintain the piston rod in an initial position relative to the pressure cylinder when the lever is not subjected to an external force;
- a brake hose connected to the other end of the brake body and communicated with the pressure cylinder; and
- a connecting rod, one end of which is connected with the lever, and the other end of which is arranged in the pressure cylinder to form a driving connection with the piston rod;

wherein, the pressure cylinder is internally provided with a limiting component, which interacts with the connecting rod to limit the connecting rod detachment from the pressure cylinder when the lever is not subjected to an external force;

an adjustable chamber is arranged in the connecting rod, and an adjustment element passes through the adjustable chamber; wherein, one end of the connecting rod extends into the adjustable chamber and forms a driving connection with the piston rod;

when in use, the adjustment element can move relative to the adjustable chamber under an external force, thereby driving the piston rod to move forwards or backwards relative to the pressure cylinder, so as to adjust the initial position of the piston rod relative to the pressure cylinder; and after the adjustment is completed, the adjustment element can maintain the initial position after the movement.

The adjustment process further involves that when the lever is not subjected to external forces, due to the obstruction of the limiting part, the connecting rod is fixed in position relative to the pressure cylinder. At this time, by applying an external force to the adjustment element, it can be moved relative to the adjustment chamber, thereby causing the extending portion of the adjustment element to extend or retract from a first opening, thereby driving the piston rod to undergo relative positional changes relative to the pressure cylinder.

According to one or more embodiments, a connection structure is arranged between the adjustment element and the adjustable chamber, which allows the adjustment element to be movably connected with the adjustable chamber.

According to one or more embodiments, the connection structure comprises threads respectively arranged on an outer side of the adjustment element and an inner wall of the adjustable chamber, enabling a threaded connection between the adjustment element and the adjustable chamber.

According to one or more embodiments, the adjustable chamber further comprises a first opening and a second opening arranged on a surface of the connecting rod; wherein, one end of the adjustment element extends through the first opening and forms a driving connection with the piston rod, and an external force can be applied to the adjustment element through the second opening to cause the adjustment element to move relative to the adjustable chamber.

According to one or more embodiments, the adjustment element comprises a head, a shaft and a tail; the head extends from the first opening and forms a connection with the piston rod, the shaft is movably connected to the adjustable chamber through the connection structure, and the tail is positioned near the second opening.

Preferably, the tail of the adjusting element is in the form of a bolt head, and the bolt head is inserted into the adjusting element at a position close to the second opening, and the bolt head can be operated through the second opening.

According to one or more embodiments, one side of the piston rod is provided with a recess, and the head of the adjustment element is inserted into and abutted with the recess; wherein a bottom surface of the recess is semicircular, and the corresponding head of the adjustment element is provided with a fitting spherical surface.

According to one or more embodiments, the limiting component comprises a snap spring fixedly connected to an inner wall of the pressure cylinder, and one end of the connecting rod is convexly provided with a ball joint; and the ball joint is positioned within the pressure cylinder and forms a limiting connection with the snap spring.

Preferably, a sealing ring is further arranged between the snap spring and the ball joint, and the connecting rod penetrates through the sealing ring and extends into the pressure cylinder. According to one or more embodiments, the lever is fixedly connected to a fixed shaft, and the fixed shaft has a through-hole; wherein one end of the connecting rod passes through the through-hole, and both an outer surface of the connecting rod and an inner wall of the through-hole are threaded to achieve a threaded connection between the connecting rod and the through-hole.

By adjusting the position relationship between the connecting rod and the threaded hole, the distance between the lever and the bracket of the brake body can be adjusted, and further the adjustment of the grip distance of the lever can be realized.

The adjustment process of this disclosure is as follows.

Using hand or tools to pass through the second opening on the connecting rod to operate and rotate the adjustment element located inside the adjustment chamber. As the adjustment element is connected to the adjustment chamber by threads, when the adjustment element rotates, the length of the end that extends through the first opening into the pressure cylinder will change. This, in turn, causes the piston rod that is in contact with the adjustment member to move forward or backward. Therefore, when pressing the lever to drive the piston rod, the initial position of the piston rod changes, indicating a change in the free stroke of the hydraulic brake.

By rotating the connecting rod relative to the lever, the connection between the connecting rod and the fixed shaft of the lever is also formed by threads. However, due to the action of the snap spring, the connecting rod cannot change its position relative to the brake body. As a result, the lever will undergo a position change relative to the brake body, and consequently, the grip distance of the lever will also change.

Therefore, in summary, this disclosure provides two ways to adjust the free stroke: adjusting the initial position of the piston rod or adjusting the grip distance of the lever. The driver can choose the method according to their own operating habits.

The advantageous effects of this disclosure are as follows.

1. Adjustment of piston rod position: by creating an adjustment chamber inside the connecting rod and placing an adjustable part inside the chamber, the movement of the adjustment element can drive the piston rod to move forward or backward. This allows for the adjustment of the initial position of the piston rod, thereby achieving the free stroke adjustment of the hydraulic brake. Since the grip distance of the lever is not altered, it does not affect the normal operation of the driver.
2. Threaded connection for precise adjustment: the threaded connection between the adjustment element and the adjustment chamber enables convenient and precise movement of the adjustment element. This provides finer control over the movement of the adjustment element, allowing the driver to make subtle reach adjustment of the hydraulic brake according to their preferences.
3. Convenient adjustment process: the adjustment chamber is equipped with a first opening and a second opening. By applying an external force through the second opening, the adjustment element can be easily moved. This simplifies the process of free stroke adjustment of the hydraulic brake.

4. Stability ensured by snap spring: The presence of the snap spring inside the pressure cylinder ensures a stable position for the connecting rod by forming a limiting connection with the ball joint on the connecting rod. This enhances the reliability and stability of the entire system during the adjustment of the initial position of the piston rod.
5. Preserved lever grip distance adjustment: the connection between the connecting rod and the fixed shaft of the lever is also achieved through threaded connection. By rotating the connecting rod relative to the lever, the distance between the lever and the brake body can be adjusted, allowing for the adjustment of the lever's grip distance to be retained.

DETAILED DESCRIPTION

Figure 1:
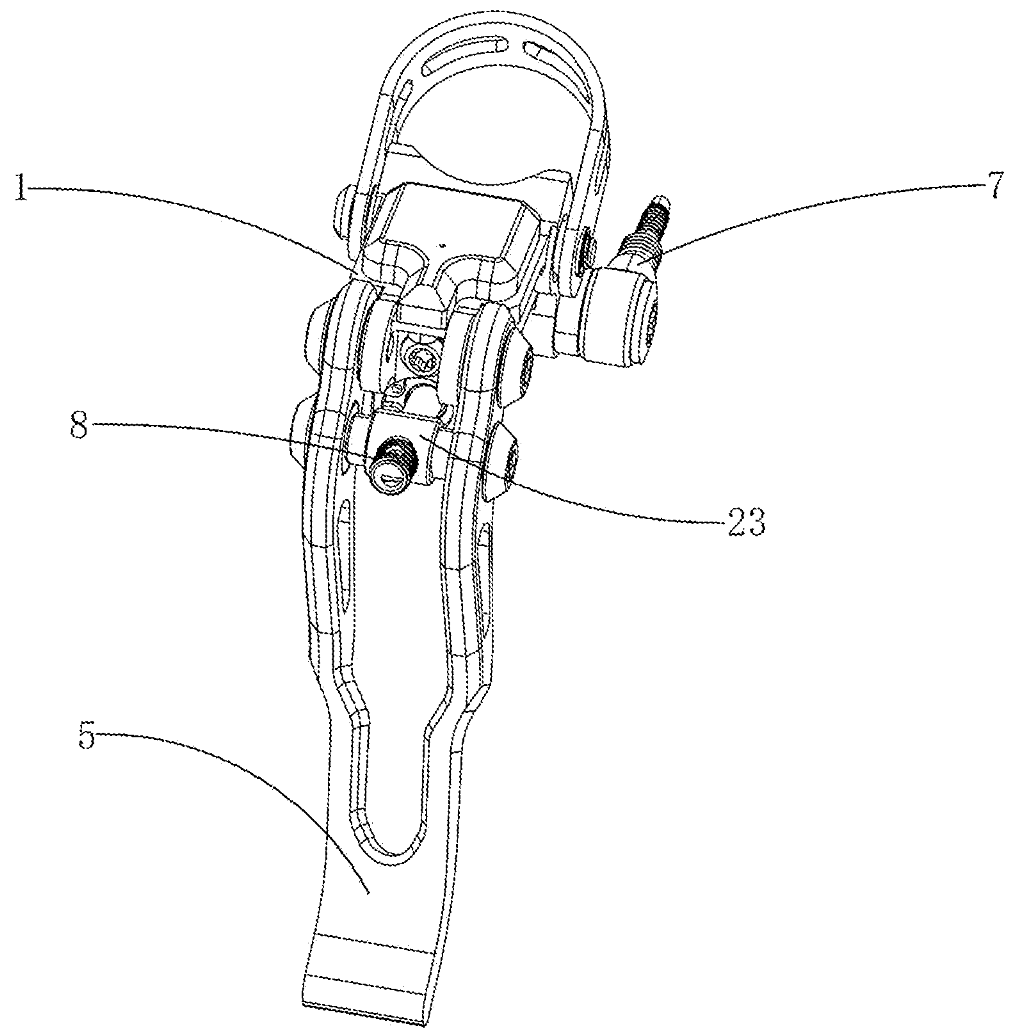
FIG. 1 is a schematic diagram of the structure of the disclosure.
Figure 2:
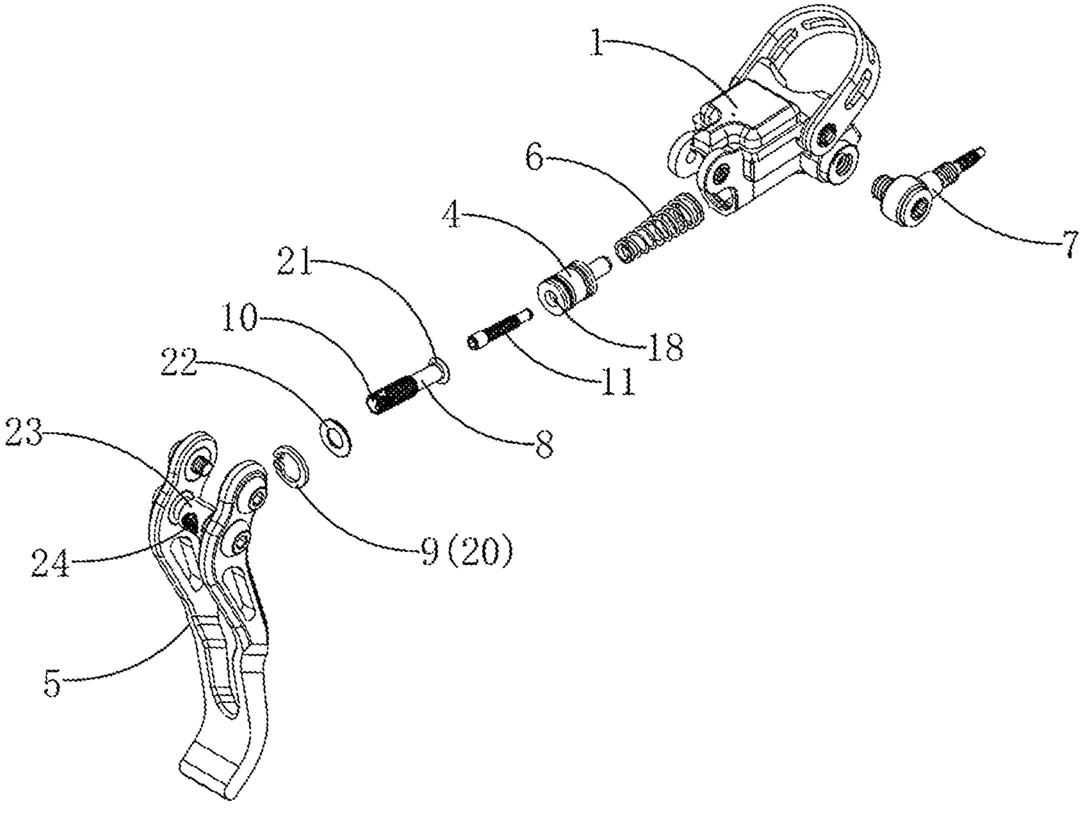
FIG. 2 is an exploded view of the disclosure.
Figure 3:
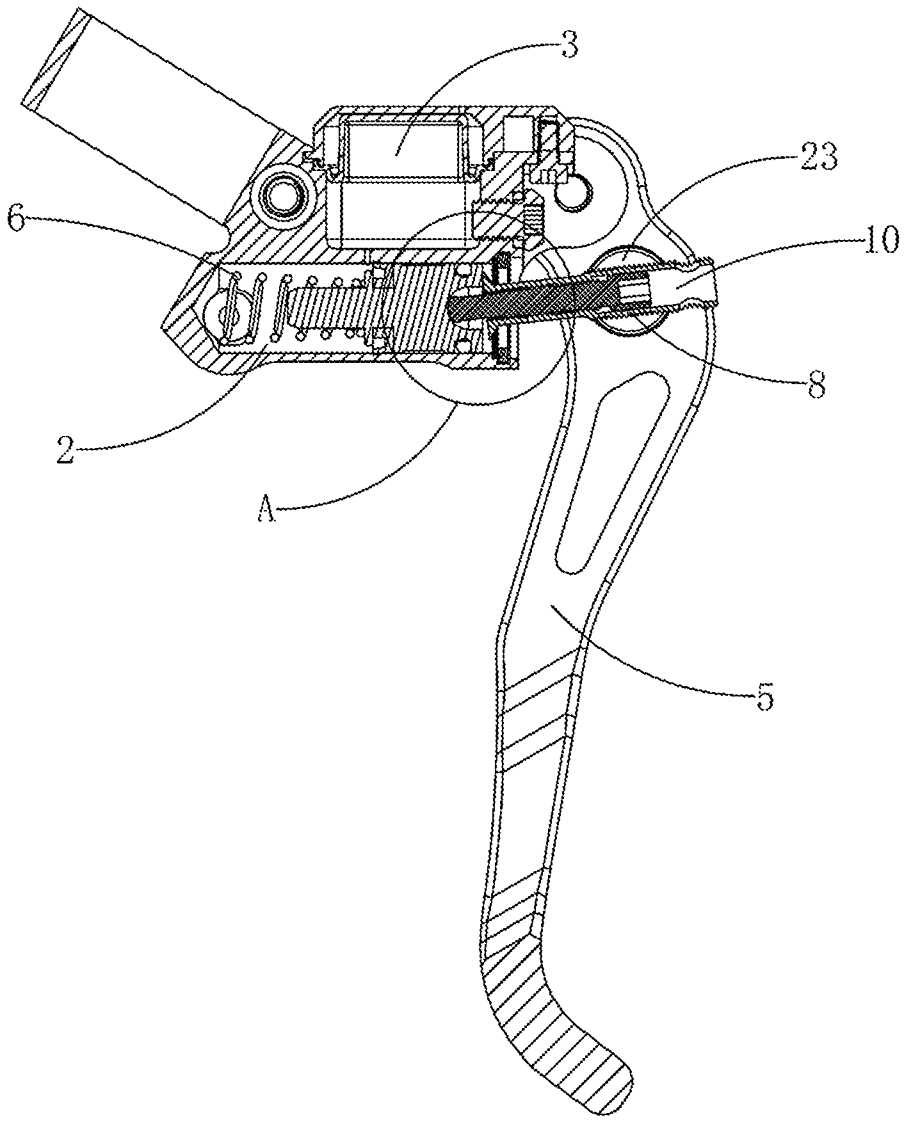
FIG. 3 is a sectional view of the disclosure.
Figure 4:
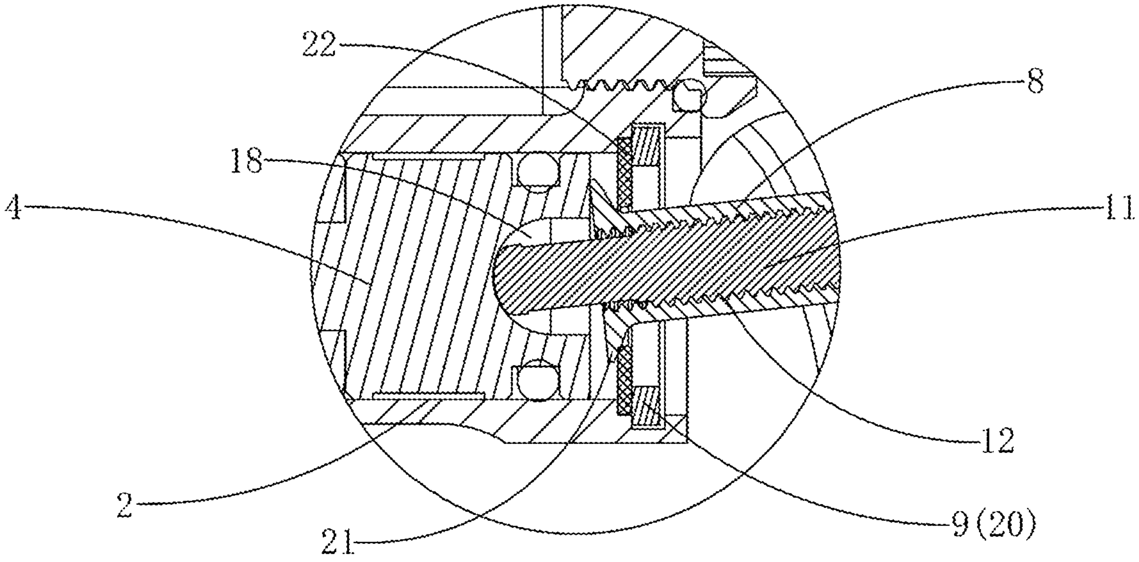
FIG. 4 is an enlarged schematic diagram of the part of A of FIG. 3.
Figure 5:
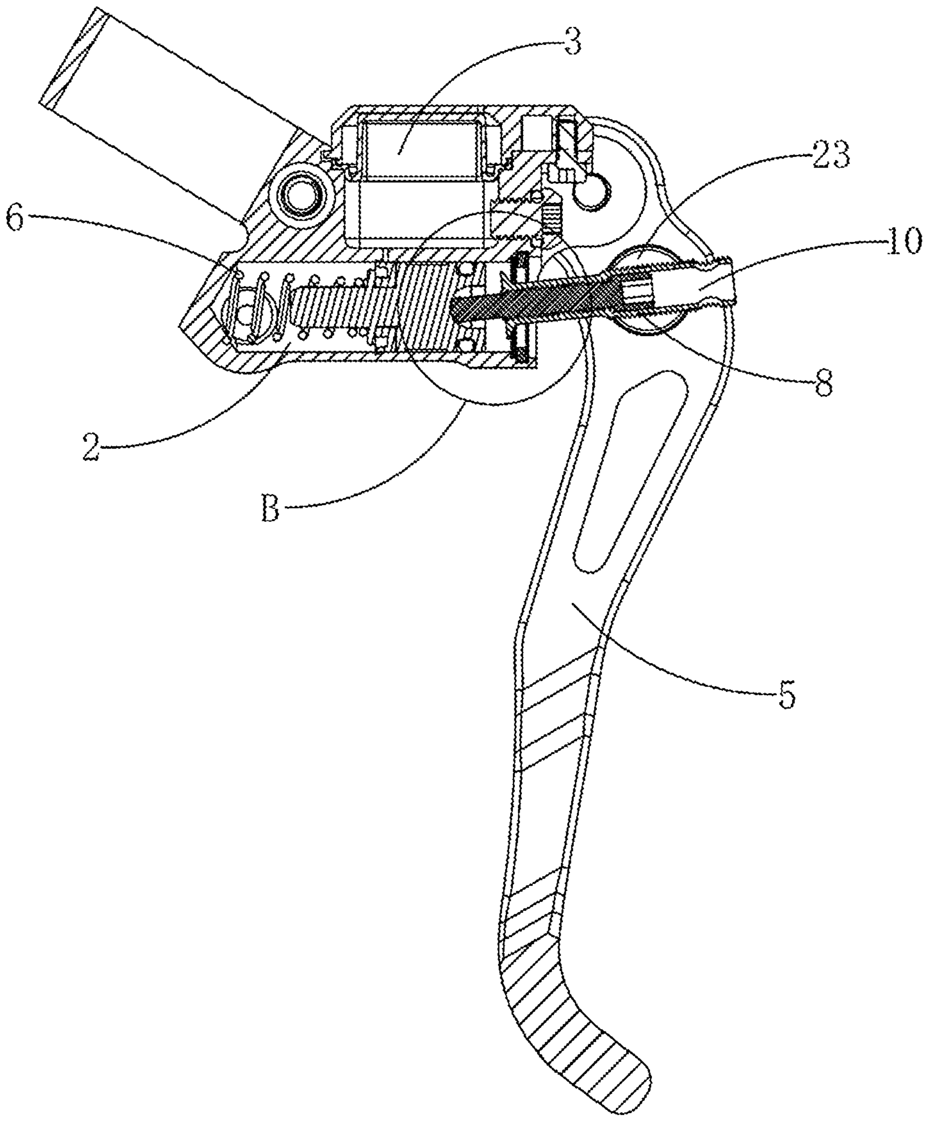
FIG. 5 is a sectional view of the disclosure showing the initial position change of the piston rod.
Figure 6:
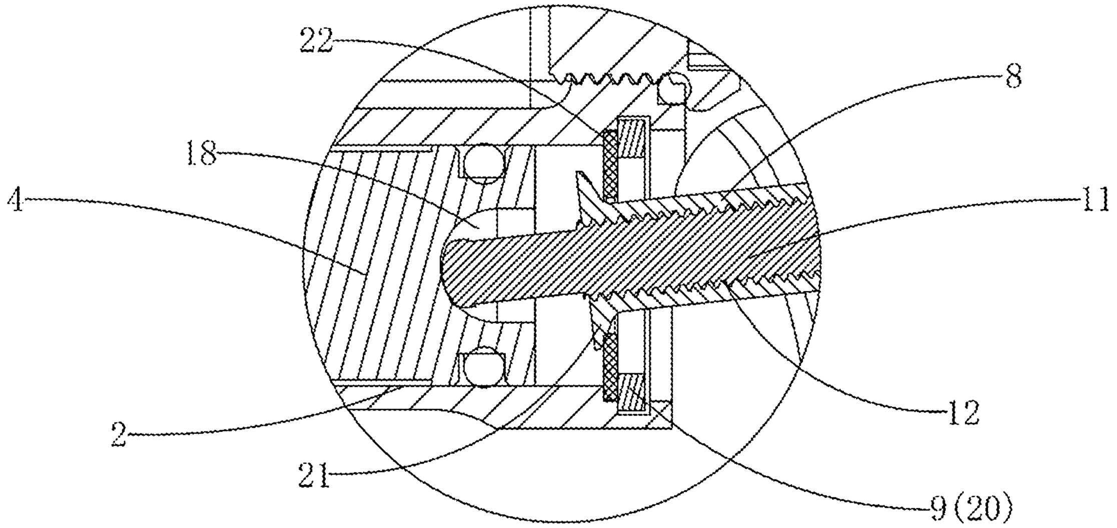
FIG. 6 is an enlarged schematic diagram of the part of B of FIG. 5.

The following is a clear and complete description of the technical solution in the embodiments of the disclosure, with reference to the accompanying drawings. It should be noted that the described embodiments are only a part of the embodiments of the present disclosure, and not the complete embodiments. Based on the embodiments of the disclosure, all other embodiments that ordinary skilled persons in the art can obtain without creative effort are within the scope of protection of the disclosure.

It should be understood that although terms such as upper, middle, lower, top, and one end are used to describe various components in this document, these terms are not limiting. These terms are used only to distinguish the components from each other for ease of understanding, and not to define any direction or order restrictions.

Implementation Example

As shown in FIGS. 1-10, a hydraulic brake with travel adjustment mechanism comprises a brake body 1, a piston rod 4, a lever 5, a spring 6, a brake hose 7, and a connecting rod 8. The brake body 1 comprises a pressure cylinder 2 and an oil storage cylinder 3 which are connected with each other. The piston rod 4 is movably positioned within the pressure cylinder 2. The Lever 5 is rotatably connected to one end of the brake body 1 and is in transmission connection with the piston rod 4. The spring 6 is connected between the piston rod 4 and an inner wall of the pressure cylinder 2, keeping the piston rod 4 in its initial position relative to the pressure cylinder 2 when the lever 5 is not subjected to external force. The brake hose 7 is connected to the other end of the brake body 1 and communicates with the pressure cylinder 2. One end of the connecting rod 8 is connected to the lever 5, and the other end of the connecting rod 8 passes through the pressure cylinder 2 and is in transmission engagement with the piston rod 4. The pressure cylinder 2 is provided with a limiting component 9 fixedly arranged therein, which limits the movement of the connecting rod 8 in relation to the pressure cylinder 2. The connecting rod 8 is provided with an adjustment chamber 10, in which an adjustment element 11 is positioned. One end of the connecting rod 8 extends into the adjustment chamber 10 and is in transmission engagement with the piston rod 4. When in use, the adjustment element 11 can move within the adjustment chamber 10 under an external force and drive the piston rod 4 to move forward or backward relative to the pressure cylinder 2, thereby adjusting the initial position of the piston rod 4 relative to the pressure cylinder 2. After the adjustment is completed, the adjustment element 11 can maintain its initial position after the movement.

During the stroke adjustment process, when the lever 5 is not subjected to an external force, the connecting rod 8 remains fixed in position relative to the pressure cylinder 2 due to the obstruction of the limiting component 9. At this time, by applying an external force to the adjustment element 11, the extending portion of the adjustment element 11 from the first opening 13 can be lengthened or shortened, thereby causing a relative positional change of the piston rod 4 relative to the pressure cylinder 2.

According to one or more embodiments, as shown in FIGS. 3-6, a connecting structure 12 is additionally provided between the adjustment element 11 and the adjustment chamber 10. The connecting structure 12 includes threads provided on a peripheral side of the adjustment element 11 and an inner wall of the adjustment chamber 10, allowing the adjustment element 11 and the adjustment chamber 10 to be connected by thread engagement.

Figure 8:
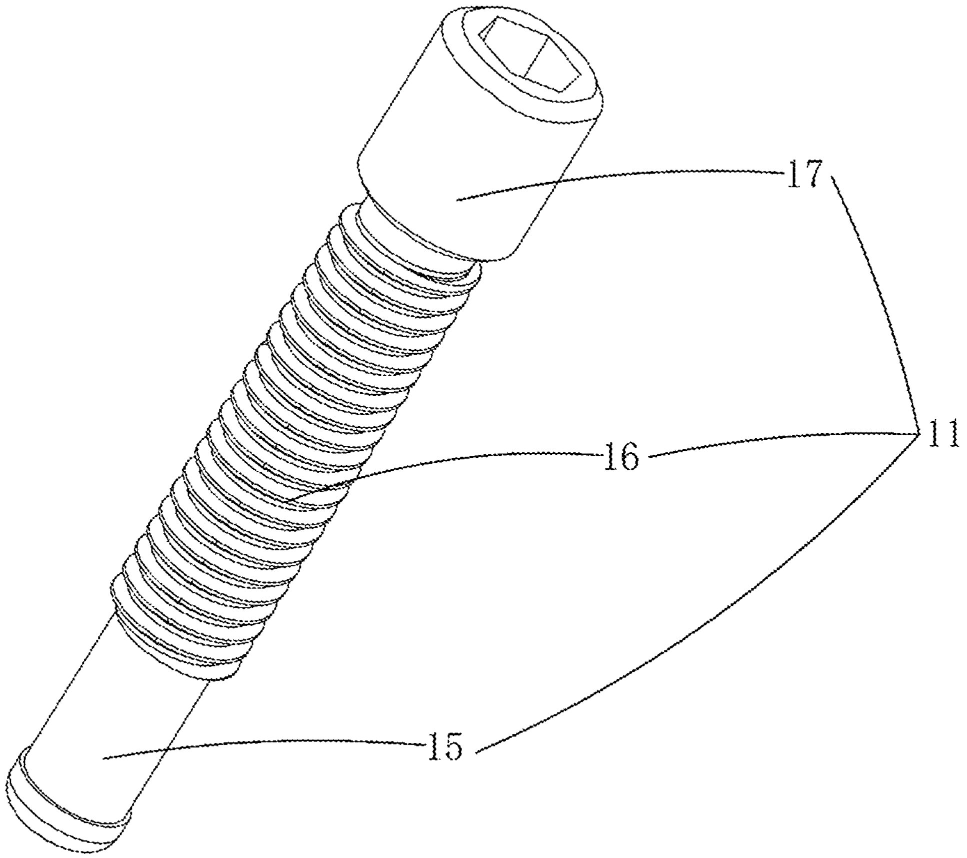
FIG. 8 is a schematic diagram showing the structure of the adjustment element of the disclosure.

According to one or more embodiments, as shown in FIG. 8, the adjustment chamber 10 includes a first opening 13 and a second opening 14 set on a surface of the connecting rod 8. One end of the adjustment element 11 passes through the first opening 13 and is in transmission engagement with the piston rod 4, while an external force can be applied to the adjustment element 11 through the second opening 14 to move the adjustment element 11 relative to the adjustment chamber 10.

Figure 7:
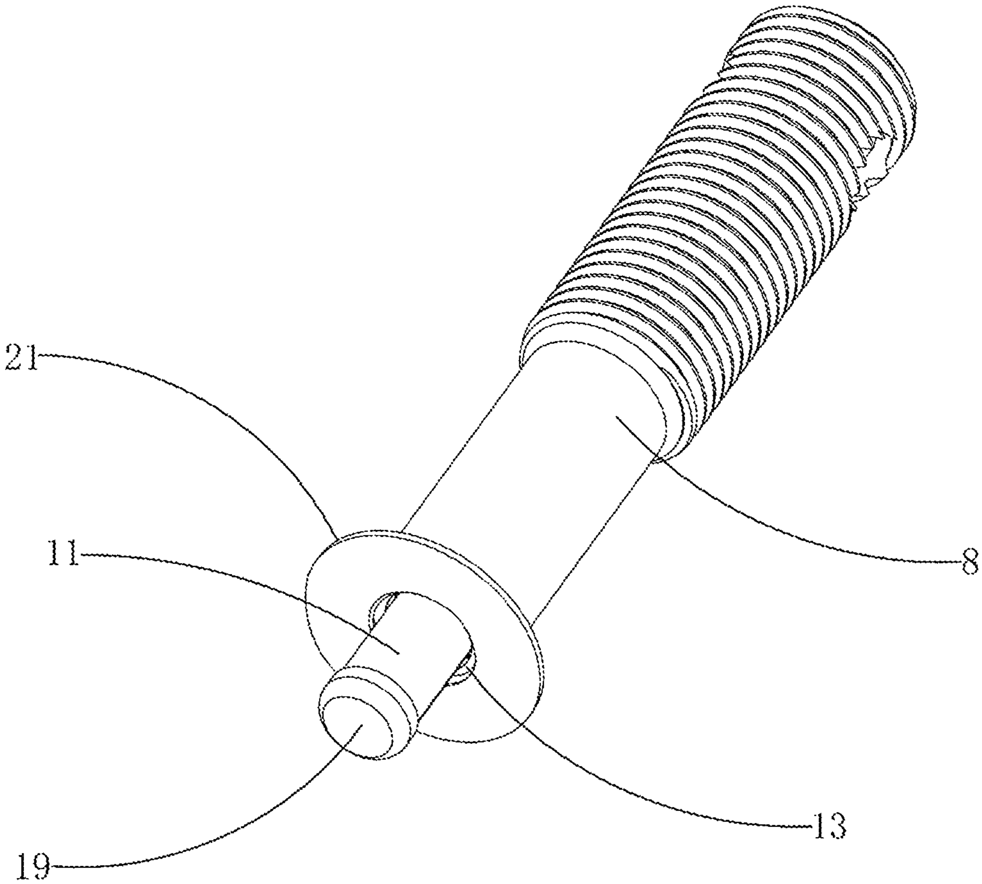
FIG. 7 is a schematic diagram showing the mating state between the connecting rod and the adjustment element of the disclosure.

According to one or more embodiments, as shown in FIGS. 7-8, the adjustment element 11 comprises a head 15, a shaft 16, and a tail 17. The head 15 extends from the first opening 13 and is in engagement with the piston rod 4, while the shaft 16 is movably connected to the adjustment chamber 10 through the connecting structure 12. The tail 17 of the adjustment element 11 is a bolt head and is positioned inside the adjustment element 11 near the second opening 14, allowing the bolt head to be operated through the second opening 14.

According to one or more embodiments, as shown in FIGS. 3-6, a recess 18 is arranged on one side of the piston rod 4, and the head 15 of the adjustment element 11 is inserted into and abutted with the recess 18. The bottom surface of the recess 18 is semi-spherical, corresponding to a mating spherical surface 19 on the head 15 of the adjustment element 11.

Figure 9:
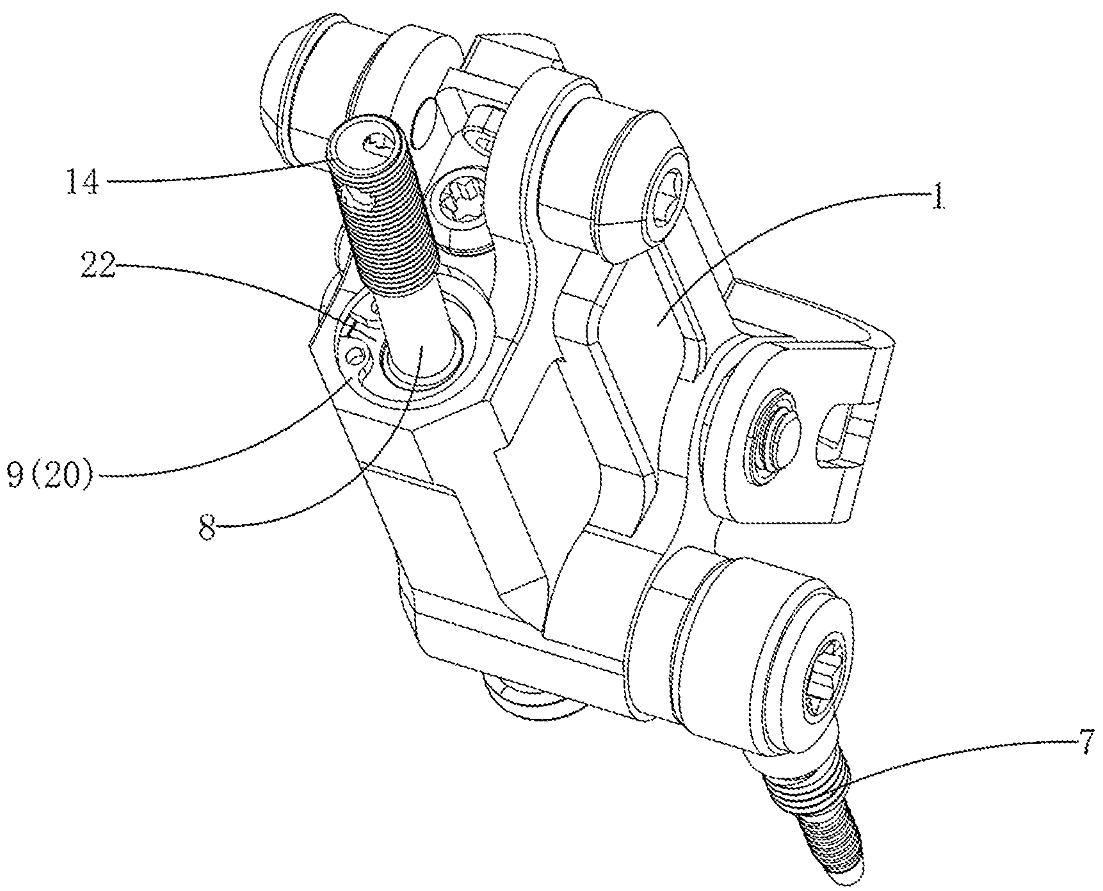
FIG. 9 is a schematic diagram showing the mating state between the connecting rod and the brake body of the disclosure.

As shown in FIG. 9, the limiting component 9 includes a snap spring 20 fixedly connected to an inner wall of the pressure cylinder 2, and one end of the connecting rod 8 is convexly provided with a ball joint 21. The ball joint 21 passes through the pressure cylinder 2 and is in limit engagement with the snap spring 20, and a sealing ring 22 is arranged between the snap spring 20 and the ball joint 21. The connecting rod 8 extends through the sealing ring 22 into the pressure cylinder 2.

Figure 10:
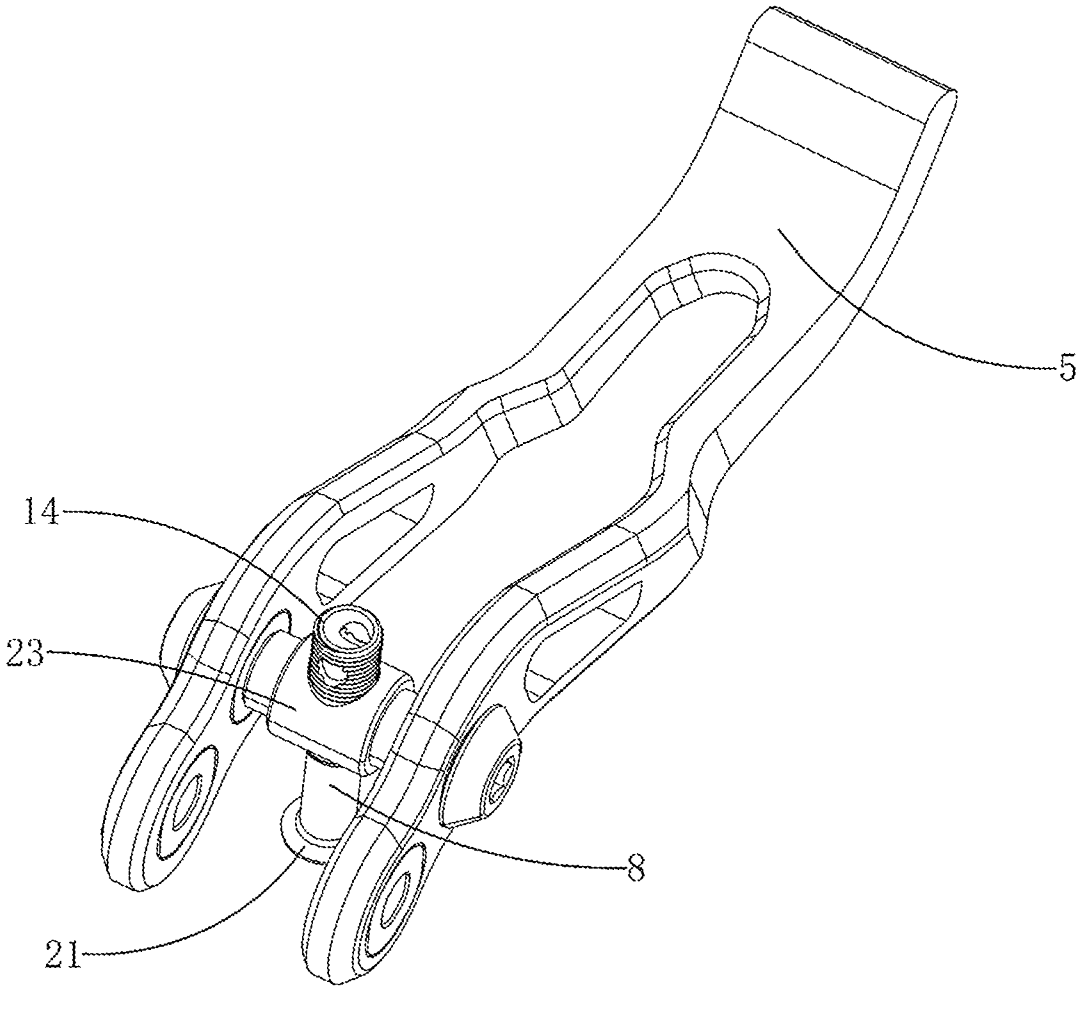
FIG. 10 is a schematic diagram showing the mating state between the connecting rod and the lever of the disclosure.

According to one or more embodiments, as shown in FIG. 10, the lever 5 is fixedly connected with a fixed shaft 23, and the fixed shaft 23 has a through-hole 24. One end of the connecting rod 8 passes through the through-hole 24, and both the peripheral side of the connecting rod 8 and the inner wall of the through-hole 24 have threads. The connection between the connecting rod 8 and the through-hole 24 is achieved through thread engagement. By adjusting the position relationship between the connecting rod 8 and the threaded hole, the distance between the lever 5 and the bracket of the brake body 1 can be adjusted, thereby adjusting the grip distance of the lever 5.

The adjustment process of the disclosure is as follows.

By using hands or tools to access the second opening 14 on the connecting rod 8, the adjustment element 11 located in the adjustment chamber 10 can be operated and rotated. Since the adjustment element 11 is connected to the adjustment chamber 10 by thread engagement, when the adjustment element 11 rotates, the length of one end of the adjustment element 11 that extends into the pressure cylinder 2 through the first opening 13 will change, thereby causing the piston rod 4 in contact with the adjustment element 11 to move forward or backward. This results in a change in the initial position of the piston rod 4 during the process of pressing the lever 5 to drive the piston rod 4. Furthermore, by rotating the connecting rod 8 relative to the lever 5, since the connecting rod 8 cannot move relative to the brake body 1 due to the action of the snap spring 20, the lever 5 will change its position relative to the brake body 1, and thus the grip distance of the lever 5 will change.

Therefore, in summary, in this disclosure, there are two ways to adjust the free stroke: adjusting the initial position of the piston rod 4 or adjusting the grip distance of the lever 5. Drivers can choose according to their operating habits.

The advantage of the disclosure lies in the ability to adjust the initial position of the piston rod by means of the adjusting member, thereby changing the free stroke of the hydraulic brake without altering the grip distance of the lever.

The above merely describes specific embodiments of the present disclosure, which is not intended to limit the scope of protection of the present disclosure. Any modifications, equivalent variations or substitutions, and improvements made within the spirit and principle of the present disclosure by those skilled in the art according to the disclosed technical scope should be included in the protection scope of the present disclosure.

What is claimed is:

1. A hydraulic brake with travel adjustment mechanism, comprising:

a brake body in which a pressure cylinder is arranged;

a piston rod movably inserted into the pressure cylinder;

a lever rotatably connected to one end of the brake body and forming a driving connection with the piston rod while being subjected to an external force;

a spring that exerts force on the piston rod to maintain the piston rod in an initial position relative to the pressure cylinder when the lever is not subjected to an external force;

a brake hose connected to the other end of the brake body and communicated with the pressure cylinder; and a connecting rod, one end of which is connected with the lever, and the other end of which is arranged in the pressure cylinder to form a driving connection with the piston rod;

wherein, the pressure cylinder is internally provided with a limiting component, which interacts with the connecting rod to limit the connecting rod detachment from the pressure cylinder when the lever is not subjected to an external force;

characterized in that:

an adjustable chamber is arranged in the connecting rod, and an adjustment element passes through the adjustable chamber; wherein, one end of the connecting rod adjustment element extends into the adjustable chamber and forms a driving connection with the piston rod;

when in use, the adjustment element can move relative to the adjustable chamber under an external force, thereby driving the piston rod to move forwards or backwards relative to the pressure cylinder, so as to adjust the initial position of the piston rod relative to the pressure cylinder; and after the adjustment is completed, the adjustment element can maintain the initial position after the movement;

the limiting component comprises a snap spring fixedly connected to an inner wall of the pressure cylinder, and one end of the connecting rod is convexly provided with a ball joint, and the ball joint is positioned within the pressure cylinder and forms a limiting connection with the snap spring.

2. The hydraulic brake with travel adjustment mechanism according to claim 1, characterized in that: a connection structure is arranged between the adjustment element and the adjustable chamber, which allows the adjustment element to be movably connected with the adjustable chamber.

3. The hydraulic brake with travel adjustment mechanism according to claim 2, characterized in that: the connection structure comprises threads respectively arranged on an outer side of the adjustment element and an inner wall of the adjustable chamber, enabling a threaded connection between the adjustment element and the adjustable chamber.

4. The hydraulic brake with travel adjustment mechanism according to claim 2, characterized in that: the adjustable chamber further comprises a first opening and a second opening arranged on a surface of the connecting rod; wherein, one end of the adjustment element extends through the first opening and forms a driving connection with the piston rod, and an external force can be applied to the adjustment element through the second opening to cause the adjustment element to move relative to the adjustable chamber.

5. The hydraulic brake with travel adjustment mechanism according to claim 4, characterized in that: the adjustment element comprises a head, a shaft and a tail; the head extends from the first opening and forms a connection with the piston rod, the shaft is movably connected to the adjustable chamber through the connection structure, and the tail is positioned near the second opening.

6. The hydraulic brake with travel adjustment mechanism according to claim 5, characterized in that: one side of the piston rod is provided with a recess, and the head of the adjustment element is inserted into and abutted with the recess; wherein a bottom surface of the recess is semicircular, and the corresponding head of the adjustment element is provided with a fitting spherical surface.

7. The hydraulic brake with travel adjustment mechanism according to claim 1, characterized in that: the lever is fixedly connected to a fixed shaft, and the fixed shaft has a through-hole; wherein one end of the connecting rod passes through the through-hole, and both an outer surface of the connecting rod and an inner wall of the through-hole are threaded to achieve a threaded connection between the connecting rod and the through-hole.

* * * * *